(12) United States Patent
Garduno

(10) Patent No.: US 7,467,801 B1
(45) Date of Patent: Dec. 23, 2008

(54) RESIDENTIAL MOBILE HOUSE KEEPING CART

(76) Inventor: Mickey Garduno, 429 N. 9th St., Montrose, CO (US) 81401

( * ) Notice: Subject to any disclaimer, the term of this patent is extended or adjusted under 35 U.S.C. 154(b) by 261 days.

(21) Appl. No.: 11/044,850

(22) Filed: Jan. 26, 2005

Related U.S. Application Data

(60) Provisional application No. 60/539,700, filed on Jan. 28, 2004.

(51) Int. Cl.
    *B62B 3/00* (2006.01)
(52) U.S. Cl. .................................. 280/47.26; 280/47.35
(58) Field of Classification Search ............. 280/47.17, 280/47.19, 47.24, 47.26, 47.27, 47.34, 47.35, 280/79.11, 79.2, 79.3, 79.5; 312/218
    See application file for complete search history.

(56) References Cited

U.S. PATENT DOCUMENTS

| | | | | |
|---|---|---|---|---|
| 2,780,822 A | | 2/1957 | Dickinson | |
| 2,964,328 A | * | 12/1960 | Muir | 280/47.19 |
| 3,162,462 A | * | 12/1964 | Elders | 280/47.35 |
| 3,403,800 A | * | 10/1968 | Americo | 414/490 |
| 3,409,932 A | | 11/1968 | George | |
| 3,420,540 A | * | 1/1969 | Bird | 280/5.22 |
| 3,874,755 A | * | 4/1975 | Hegg et al. | 312/221 |
| 4,044,569 A | * | 8/1977 | Harza | 62/341 |
| 4,076,349 A | | 2/1978 | Gettleman | |
| 4,404,704 A | | 9/1983 | Rabban | |
| 4,534,576 A | * | 8/1985 | Jones, Jr. | 280/47.26 |
| 4,875,696 A | * | 10/1989 | Welch et al. | 280/47.34 |
| 5,069,466 A | * | 12/1991 | Propst | 280/79.3 |
| 5,244,220 A | * | 9/1993 | Cortez | 280/47.26 |
| 5,333,885 A | * | 8/1994 | Pullman | 280/47.19 |
| 5,419,569 A | * | 5/1995 | Walla | 280/47.27 |
| 5,511,807 A | * | 4/1996 | Snyder | 280/47.26 |
| 5,673,983 A | * | 10/1997 | Carlson et al. | 312/218 |
| 5,711,438 A | * | 1/1998 | Smith | 211/149 |
| 5,893,572 A | * | 4/1999 | Parks | 280/47.18 |
| 6,497,423 B1 | | 12/2002 | Perelli | |
| 6,511,138 B1 | * | 1/2003 | Gardner et al. | 312/217 |
| 6,572,123 B2 | | 6/2003 | Calmeise | |
| 6,695,325 B2 | * | 2/2004 | Carrillo | 280/47.34 |

* cited by examiner

*Primary Examiner*—Frank B Vanaman
(74) *Attorney, Agent, or Firm*—Crossley Patent Law; Mark A. Crossley

(57) ABSTRACT

A compact, lightweight, residential mobile house keeping cart, designed with low center of gravity. The cart provides for attachment and easily accessed storage of virtually all supplies and implements needed for cleaning. Easily transported by a user, the cart has two rear wheels, two front omni-directional casters, and skips on the back of the cart, whereby a ramp or elevator is not needed to access various levels or stairs, thereby providing mobility and requiring minimal space for maneuvering or storage. A plurality of implement and supply holders are disposed on the L-shaped sides and the back of the cart.

1 Claim, 6 Drawing Sheets

RESIDENTIAL MOBILE HOUSE KEEPING CART

BACKGROUND OF THE INVENTION

When skeletal remains of Pompeii were analyzed by archeologists, with the aid of experts in the medical field, the professions of some of the skeletons could be determined. One such analysis was of a woman in her late teens to early twenties. From analysis of premature joint wear and bone condition, those experts determined that her profession was in cleaning, with much time spent in scrubbing floors, bending, and the like. This was determined from the condition of her bones compared to what orthopedic professionals have gleaned from modern man/woman over the past many decades. While this was a surprise to some, it was not so to those who spend considerable time in house cleaning endeavors.

Cleaning can be an arduous task. Anything that will minimize the effort is valuable. Storage and transportation of cleaning supplies and implements is a challenge. The number of trips to acquire needed items should be kept to a minimum; therefore, the convenience and proximity of cleaning supplies and tools is of primary concern. If cleaning is a professional pursuit, having all necessary tools at immediate disposal is imperative. Reducing trips for supplies and having items needed readily at hand determines profitability. Economy of movement decreases time, effort, and fatigue. As can be referenced from above, the longevity of a person's capabilities in cleaning can also be a concern. These concerns are not just for professionals, but for anyone who cleans a home, even.

FIELD OF THE INVENTION

This invention relates to cleaning supplies, their conveyance and storage and more specifically to a residential mobile house keeping cart.

DESCRIPTION OF THE PRIOR ART

While the prior art teaches various forms of carts designed for a variety of uses, with some uses relating to cleaning tasks, there remain many needs not addressed, especially needs of home cleaning and congregated storage of cleaning supplies. By way of example:

U.S. Pat. No. 3,409,932 to George illustrates an early rendition of a portable mop bucket.

U.S. Pat. No. 2,780,822 to Dickinson describes a device for cleaning mops and other floor-sweeping implements.

U.S. Pat. No. 4,076,349 issued to Gettleman et al. a mobile, multi-compartmented cart but one which is devoted to beverage service and housing its related components.

U.S. Pat. No. 4,404,704 to Rabban discloses a cart which houses two main compartments for dealing primarily with mops.

U.S. Pat. No. 6,572,123 B2 to Calmeise et al. discloses a partially convertible utility cart but not one which is devoted to the needs of the multiple tasks involved in house cleaning.

U.S. Pat. No. 6,497,423 B1 to Perelli et al. addresses some industrial and institutional needs, with a particular eye toward chemical security. It also primarily focuses on heavy refuse removal.

Therefore, limited, specialized industrial use carts are taught in the prior art. None describe a residential mobile house keeping cart designed for storing and transporting most all of the needs of anyone who cleans a home or apartment. None teach a cart which easily negotiates stairs, either up or down. The need for improvement in the art is therefore established, particularly the need for a cart which addresses all of the needs of cleaning. A cleaning cart should first be lightweight and highly portable so that it may be easily transported where needed, including up and down stairways, and not demand an elevator or ramp in order to gain access to various levels. The cart should also be self-contained in that it will easily house and transport virtually all implements and supplies for cleaning a home, preventing unnecessary trips to acquire the same. A properly designed cart should also store those supplies so that they are readily accessible in a logical order. The cart should also be small enough for non-invasive storage itself. House cleaning does not necessarily call for large or heavy carts but rather those that might easily fit into small utility closets. Attention must be given to center of gravity so that the cart is not inclined to tip over. In addition, the cart should possess sufficient internal compartments, not only for separation of needed items, but also for isolation of those items from those who might unwittingly be injured by them; children and pets for example. With that same safety concern, provision should be made for securing the compartments. Not to be forgotten, a properly designed cart should make all items available in a fashion that lessens the physical demands on a user. The cart should also provide for storage of tools that enable a user to extend their own physical capabilities, for example a provision for ladder attachment.

SUMMARY OF THE INVENTION

In view of the foregoing disadvantages inherent in the known types of cleaning supply carts now present in the prior art, the residential mobile house keeping cart overcomes the above-mentioned disadvantages and drawbacks of the prior art. As such, the general purpose of the residential mobile house keeping cart, described subsequently in greater detail, is to provide a residential mobile house keeping cart which has all of the advantages of the prior art mentioned heretofore and many novel features that result in an improved mobile house keeping cart for home use which is not anticipated, rendered obvious, suggested, or even implied by the prior art, either alone or in combination thereof.

To accomplish this, the invention features a lightweight, typically plastic or molded plastic, highly mobile cleaning cart. The cart is an upright L-shaped octahedron. The upper vertical section of the L-shape preferably houses 3 drawers, with the uppermost being smaller than the lower drawers. The bottom horizontal section of the L-shape comprises an internal well that extends beyond the horizontal depth of the top of the L-shape. The internal well removably holds a mop bucket or the like. Preferably, a lid covers the well. In a further embodiment, the well further comprises a drawer. The cart can be transported in several ways.

First, the cart can be pushed or pulled along its back wheels and front casters, with the front casters being omni directional. The cart may also be tilted back off of its front casters and onto its back wheels, then guided by any of a plurality of handles. Further, the back, lower portion of the cart, which is the back of the L, is fitted with skids so that the cart can be leaned back against stairs for either pulling up stairs or lowering the cart down them, another important feature not found in the prior art. The skids are generally a trapezoidal shape with exposed rounded corners, to aid the cart in sliding up and down stairs and landings and the like. A more basic embodiment of the cart features front legs disposed on the bottom of the cart, rather than casters, such that cart transportation requires tilting to roll the cart along on its back wheels.

Typical tools, such as mops, brooms, dustpan, towels and the like are fastened to the exterior of the cart in a highly visible and easily removable fashion, preferably with the handles up and the implement ends downward. Removable fastening means for implements comprises spring C-clips and retaining loops for implement handle insertion. Provision is also made for a small folding ladder so that users may access areas not normally reachable. A kneepad hook is provided, as much cleaning requires hands-and-knees work. Provision is made for dry or wet mop containment, on the exterior of the cart, with an external mop well for the wet mop. The internal well in the bottom of the cart provides for holding larger buckets of mopping solutions and the like. Keeping weighty solutions at the cart's lowest level maintains a low center of gravity. The mop well lid or drawer prevents access by children or pets to solutions in the well. Containment drawers, disposed above the mop well, are accessed via large easy-to-use handles. All containment areas are designed for childproof fastening. The preferred embodiment features a spring loaded sliding lock with lock tabs which engage eyelets in a back of each drawer. The slide must be elevated against the spring pressure in order to release the drawers. Releasing the slide pull allows the spring to keep the drawers locked.

The top of the cart features wells for drinks or other liquids, as well as a lipped exterior surround to prevent spillage. Containment drawer dimensions are designed to house typically sized and used cleaners and supplies, with optional dividers to house multiple smaller needs. Containment dimensions are designed to house economically sized supplies. Also, provision is made for containment or fastening of trash receptacles. The cart accomplishes all of the above in an extremely compact manner, so that storage and transportation can seldom be an issue, even within the tightest constraints. While the carts offered vary in size to accommodate many uses and environments, the preferred embodiment is about 38 inches tall, 15 inches wide, and 8-14 inches depth, the depth being the bottom leg of the L shape. The cart is designed to carry virtually everything needed in house cleaning, such that no further areas need be dedicated to storage and such that here is no need to search for cleaners and implements.

Thus has been broadly outlined the more important features of the residential mobile house keeping cart so that the detailed description thereof that follows may be better understood and in order that the present contribution to the art may be better appreciated.

Numerous objects, features and advantages of the residential mobile house keeping cart will be readily apparent to those of ordinary skill in the art upon reading the following detailed description of presently preferred, but nonetheless illustrative, embodiments of the residential mobile house keeping cart when taken in conjunction with the accompanying drawings.

In this respect, before explaining the current embodiments of the mobile house keeping cart in detail, it is to be understood that the invention is not limited in its application to the details of construction and arrangements of the components set forth in the following description or illustration. The invention is capable of other embodiments and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the residential mobile house keeping cart. It is therefore important that the claims be regarded as including such equivalent constructions insofar as they do not depart from the spirit and scope of the present invention.

It is therefore an object of the residential mobile house keeping cart to provide for the containment and transportation of a plurality of house keeping implements and supplies.

Another object of the residential mobile house keeping cart is to be sized to allow transportation through and storage within tight confines, such as doorways, hallways, and small closets.

Yet another object of the residential mobile house keeping cart is to provide for easily transporting the cart up and down stairways and multilevels.

These together with additional objects of the residential mobile house keeping cart, along with various novel features that characterize the invention are particularly pointed out in the claims forming a part of this disclosure. For better understanding of the residential mobile house keeping cart, its operating advantages and specific objects attained by its uses, refer to the accompanying drawings and description.

DETAILED DESCRIPTION OF THE PREFERRED EMBODIMENT

With reference now to the drawings, and in particular FIGS. 1 through 6 thereof, the preferred embodiment of the mobile house cleaning cart employing the principles and concepts of the present invention and generally designated by the reference number 10 will be described.

Figure 1:
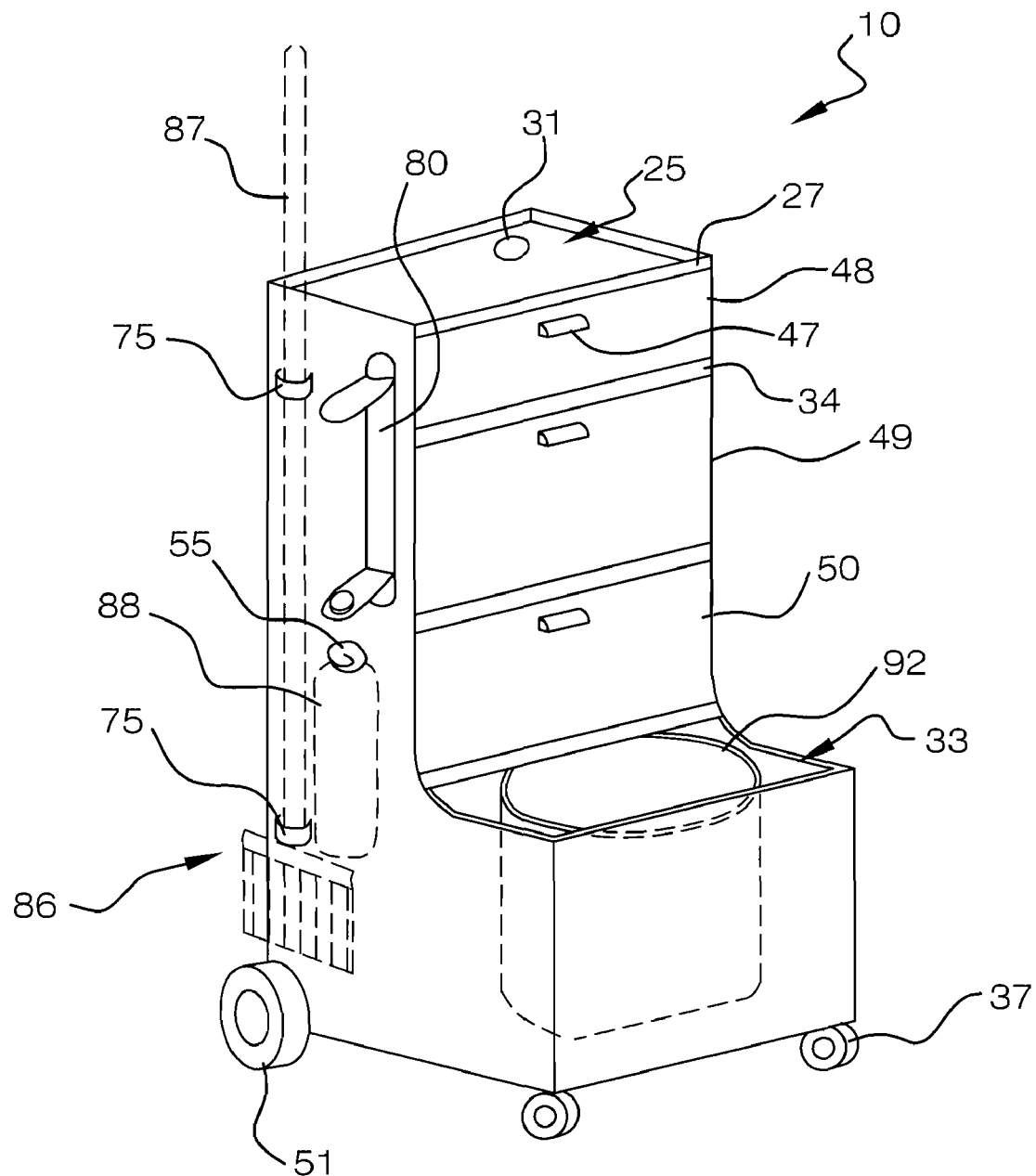
FIG. 1 is a perspective view of the mobile house cleaning cart.
Figure 5:
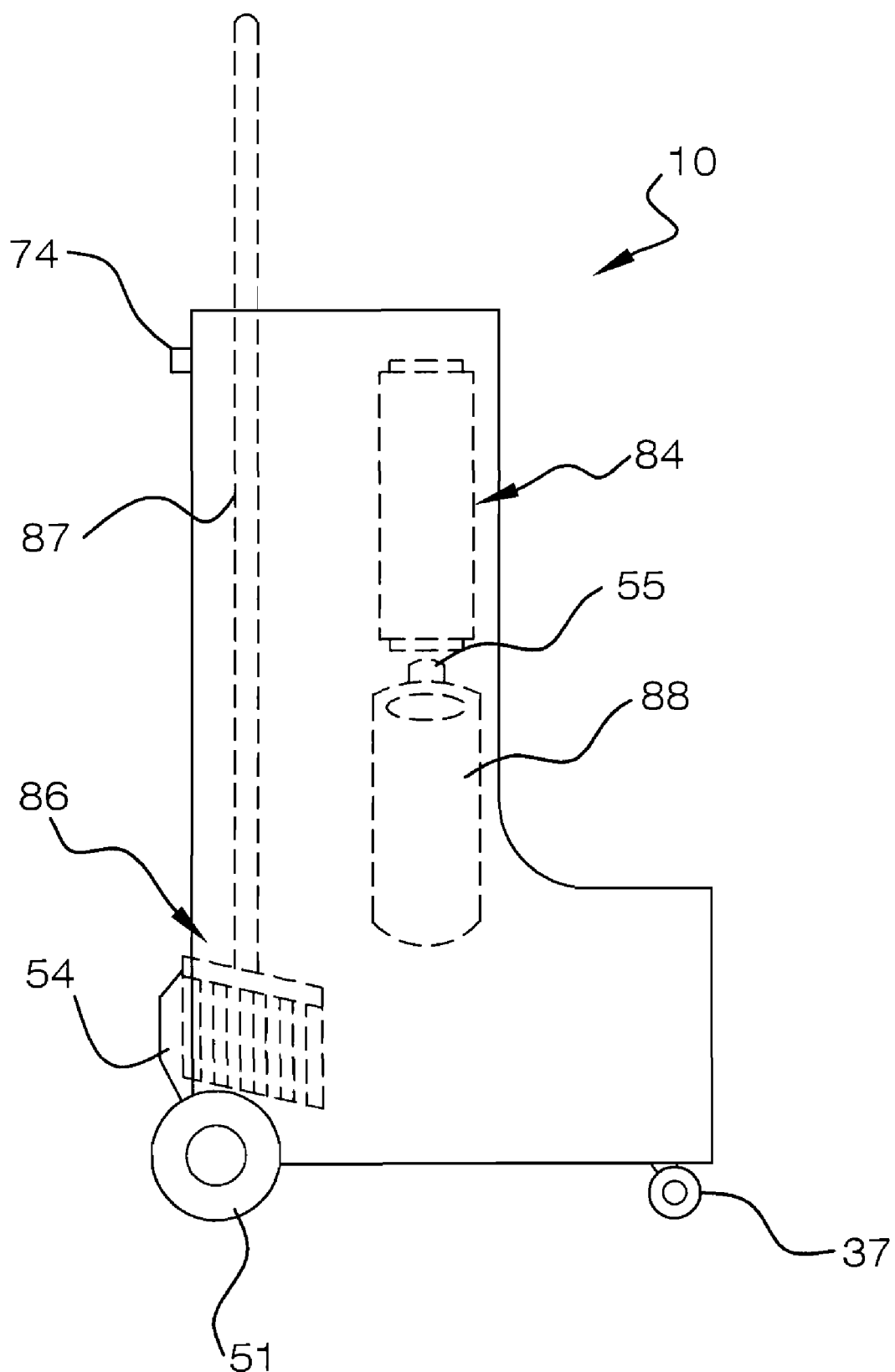
FIG. 5 is a right side lateral view of the invention illustrating broom, clipboard, and knee pad storage.

Referring to FIGS. 1 and 5, invention 10, when viewed from the side, comprises an upright L-shaped octahedron. The parallelepiped L-shape is further defined by the lower horizontal section of the L-shape seamlessly joined to the upper vertical section of the L-shape. The horizontal L section partially comprises a top, a bottom, and a front. The top is shorter than the bottom. The upper vertical section of the L partially comprises a back, a front, and a top. The upper vertical section and the lower horizontal section combine to form two spaced apart L-shaped sides. The lower horizontal section comprises internal well 33. Internal well 33 removably houses a bucket 92 for holding mopping solutions and the like (not shown). The top of the parallelepiped vertical section of the L-shape is defined by a tray 25 with a tray lip 27. Tray lip 27 is disposed about the periphery of tray 25 to aid in capturing any spills which may occur. Container holder 28 is disposed within the top of tray 25. Top drawer 48 is housed within the upper area of the vertical portion of the L-shape of invention 10. Top drawer 48 is immediately below tray 25. Middle drawer 49 is disposed immediately below drawer 48. Lower drawer 50 is disposed below middle drawer 49. Lower drawer 50 is above internal well 33. Lower drawer 50 is separated from internal well 33 by horizontally disposed drawer divider 34. Drawer divider 34 separates lower drawer 50 from drawer 49. Additional draw divider 34 separates drawer 49 from drawer 48. Top drawer 48, middle drawer 49, and lower drawer 50 are further comprised of drawer pulls 47 disposed generally upwardly and centrally within a front of each. The combination use of C-clips 75 is demonstrated in removably holding broom handle 87. The lower C-clip 75 is just above broom head 86. The right side of invention 10 is further comprised of paper towel holder 80 for holding typically sized rolls of paper towels 84 (FIG. 5). Paper towel holder 80 is disposed upwardly and vertical on the side of cart 10. Hook 55 is disposed directly below holder 80. Hook 55 removably holds knee pad 88 or other needed implements. Rear wheels 51 are disposed at each rear corner of the base of the L shaped invention 10. Rear wheels 51 revolve in a plane parallel to the sides of invention 10. The front corners of invention 10 locate omni directional casters 37 such that invention 10 can be steered in any direction. Casters 37 are disposed on a bottom surface of invention 10 (not shown).

Figure 2:
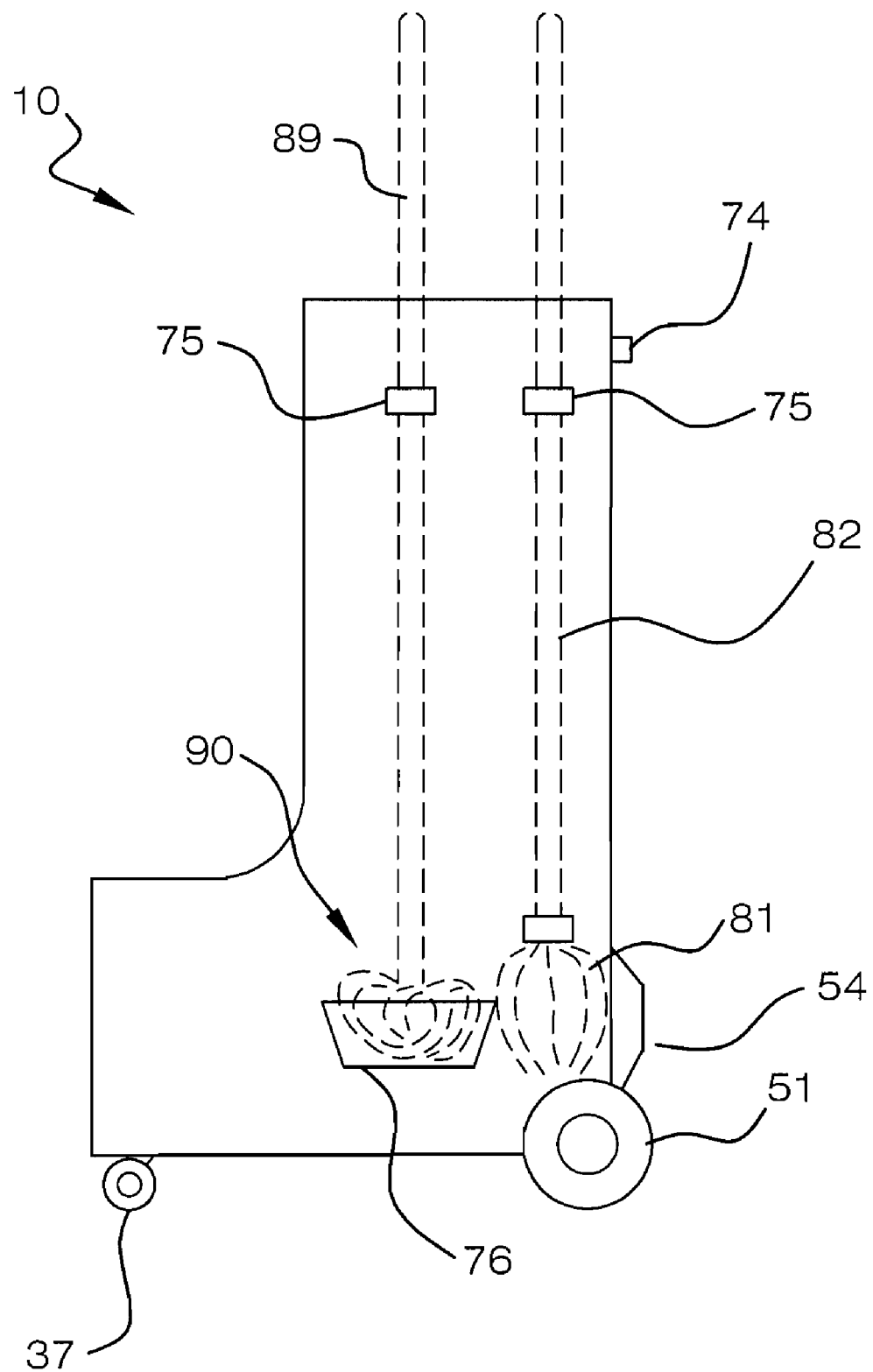
FIG. 2 is a left side lateral view of the invention, illustrating cleaning implement storage.

Referring to FIG. 2, the left side of cart 10 is further comprised of spring C-clips 75; Two C-clips 75 are disposed upwardly and are horizontally spaced apart. One C-clip 75 disposed toward the bottom of side 53 and directly below the rear most upper C-clip 75 C-clips 75 removably hold dust mop handle 82. The lower most C-clip 75 just above dust mop head 81. Exterior mop well 76 is affixed to and disposed below the forward most upper C-clip 75. Exterior mop well 76 is proximal to bottom of invention 10. The back of the cart is further comprised of the horizontally and upwardly disposed handle and towel rack 74. Skid 54 is disposed near the bottom of the back of the cart 10, above the wheels 51. Skids 54 are disposed on each side of the back. Skids 54 are of a general trapezoidal shape, with the back, exposed side having rounded corners. The skids 81 are thereby aided in sliding up and down stairs and the like (not shown).

Figure 3:
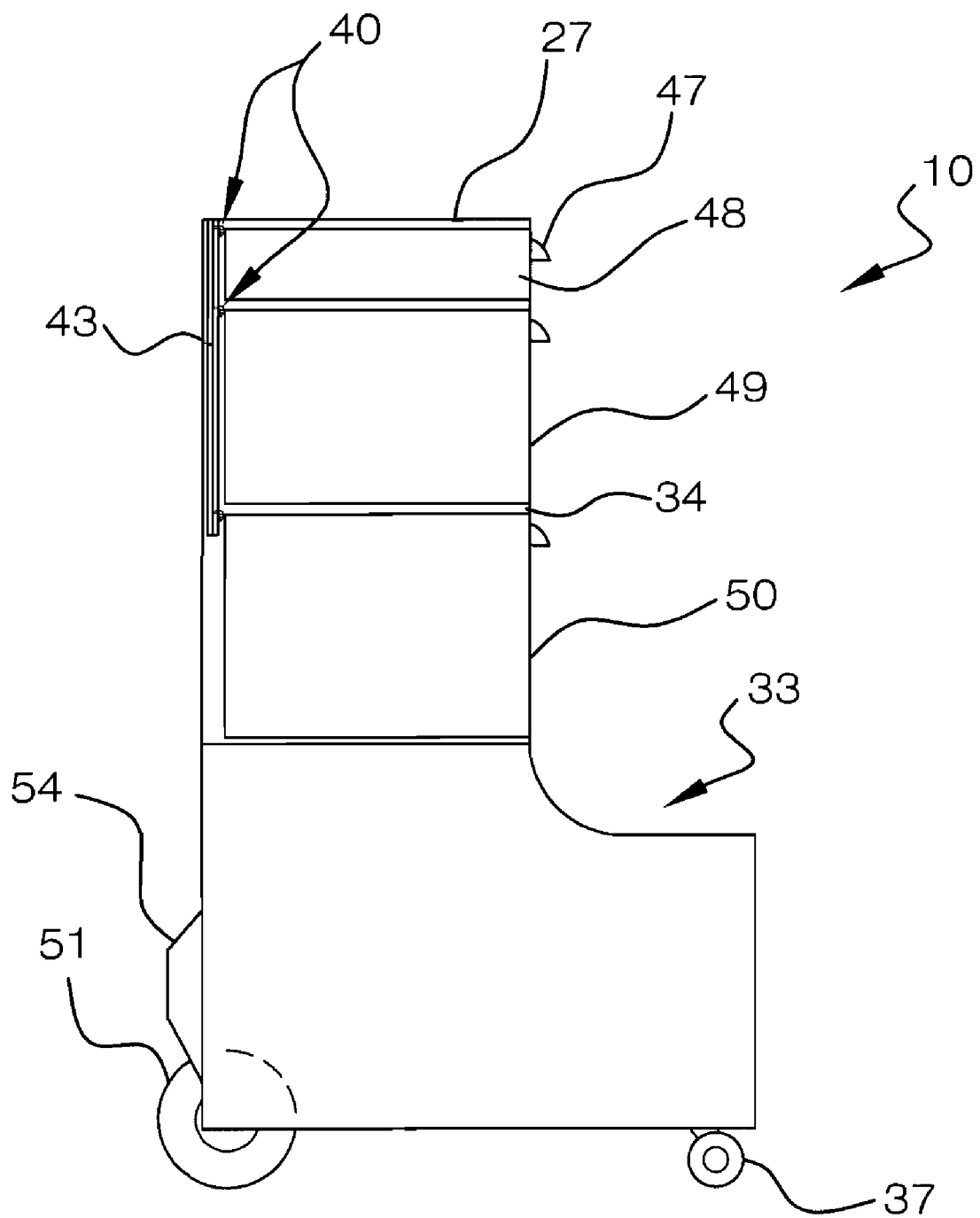
FIG. 3 is a right side lateral cross sectional view, also illustrating the drawer locking mechanism.
Figure 4:
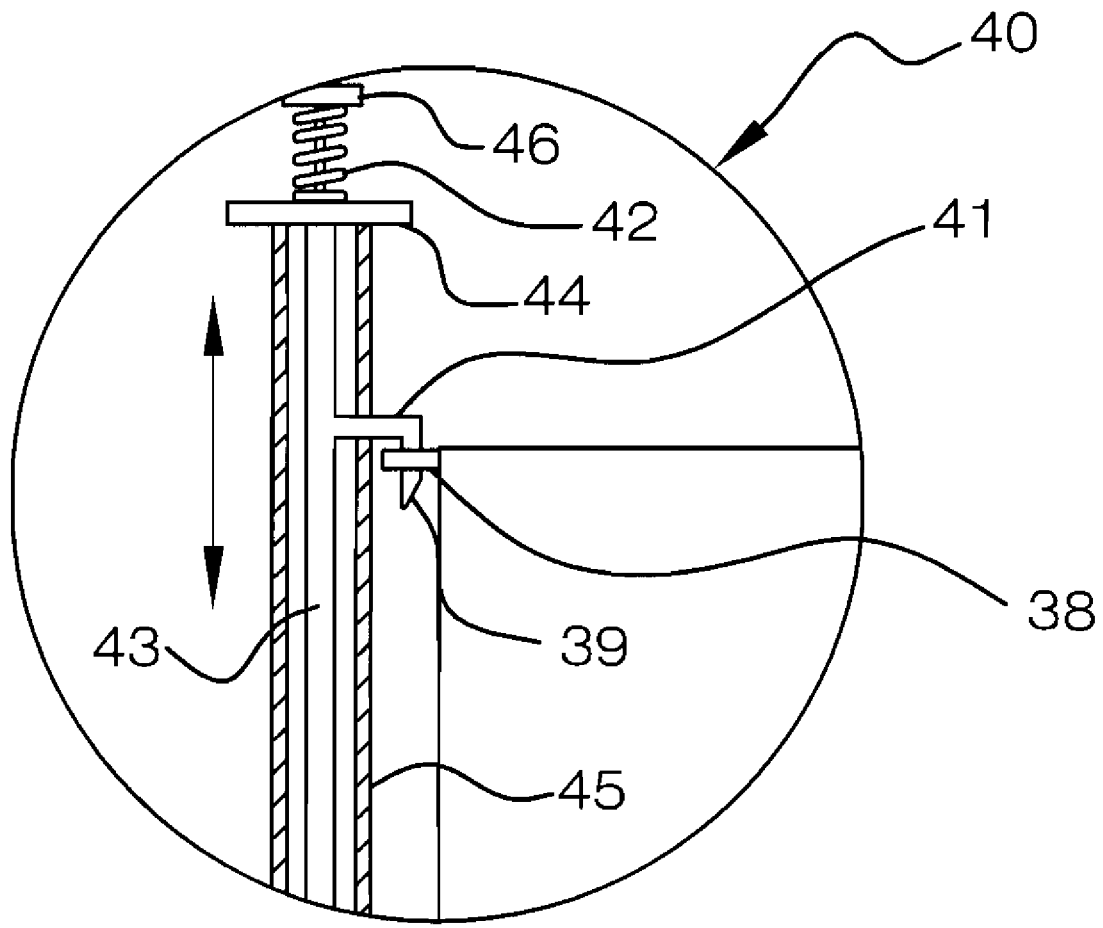
FIG. 4 is an expanded view of the drawer locking mechanism of FIG. 3.

Referring to FIGS. 3 and 4, the cross sectional view of invention 10 is comprised of top drawer 48, middle drawer 49, and lower drawer 50. Sliding lock mechanism 40 is a spring loaded locking feature to prevent inadvertent invasion of cart 10 contents by children, pets, or other unwanted intruders (not shown). Vertical housing 45 houses vertical slide 43. Horizontal eyelets 38 extend horizontally backward from a top back of each of the top drawer 48, middle drawer 49 and lower drawer 50. Slide 43 is further comprised of lock tabs 39. Lock tabs 39 extend downwardly and perpendicularly to tab transverses 41. Tab transverses 41 extend perpendicularly from slide 43 toward a back of each of top drawer 48, middle drawer 49 and lower drawer 50. Lock tabs 39 are extended downwardly and perpendicularly from horizontal tab transverses 41. Tabs 39 are positioned to slideably fit within eyelets 38. Slide 43 extends upwardly through and past horizontally disposed abutment 44. Abutment 44 is affixed to housing 45. The top of lock mechanism 40 is a spring stop 46. An extension spring 42 is housed about the top of the slide 43. Extension spring 42 is atop abutment 44. Pulling upwardly on spring stop 46 overcomes extension spring 42. Upward movement of slide 43 pulls lock tabs 39 out of eyelets 38, thereby freeing any and all of: top drawer 47, middle drawer 48 and lower drawer 50 to be pulled open.

Figure 6:
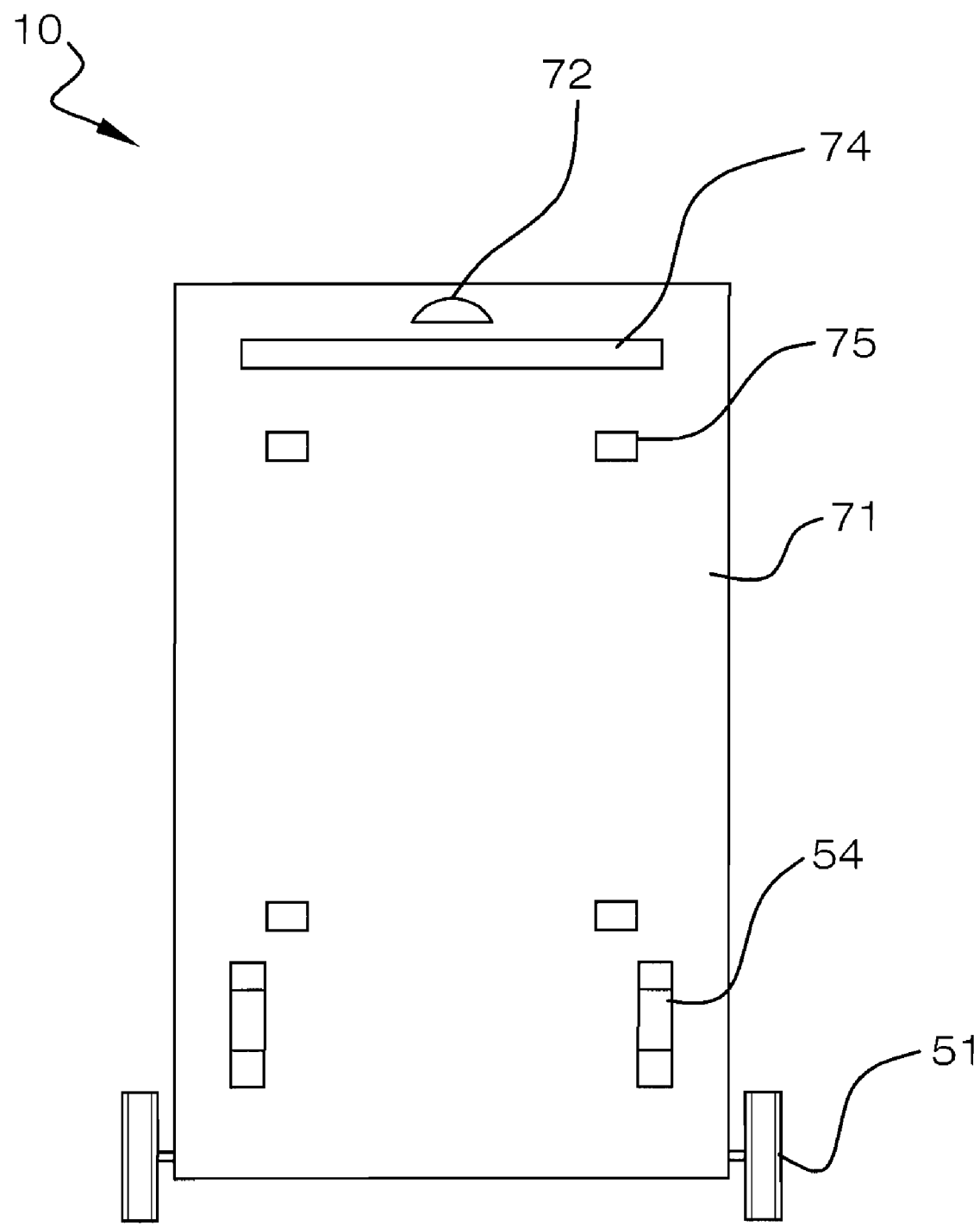
FIG. 6 is a back view of the invention.

Referring to FIG. 6, upper cart handle 72 is disposed upwardly and centrally on back cart panel 71. Handle 74 is disposed just below handle 72. Handle 74 is horizontally disposed. Handle 74 also comprises a towel rack. Spring C-clips 75 are disposed about back cart panel 71. Two C-clips 75 are horizontally spaced apart and disposed proximally to handle 74. Two spaced apart C-clips 75 are disposed toward the bottom of back cart panel 71 and directly below upper C-clips 75. C-clips 75 are used either separately or tandemly to hold various implements (not shown).

In use, invention 10 is removed from any chosen storage location, then loaded with any and all implements and supplies heretofore discussed, as well as others not individually named, if not already containing such. Appropriate C-clips are utilized to contain various implements such as broom handle 87 with broom head 86, mop handle 89 with mop head 90, dust mop handle 82 with dust mop head 81, and the like. Paper towels 84 are removably held within paper towel holder 80. Removable bucket 92 is filled with any appropriate material. Exterior mop well 76 is either partially filled with any chosen solution or is left as a catch for any liquid or material which might drip from mop head 90. Top drawer 48, middle drawer 49, and lower drawer 50 are utilized to house various cleaning solutions, rags, tools, or other desired items (not shown). Spring stop 46 is elevated to disengage lock tabs 39 from drawer eyelets 38. Top drawer 48, middle drawer 49 and lower drawer 50 are thereby disengaged from sliding lock mechanism 40. Re-engagement of sliding lock mechanism 40 is accomplished by elevating spring stop 46 and returning top drawer 48, middle drawer 49 or lower drawer 50, then releasing spring stop 46. Cart 10 is most easily conveyed by pushing or pulling either with handle 72 or handle 74. Casters 37 provide for omni directional movement of cart 10. For negotiating stairs or varied levels, invention 10 is held and tilted backward via handle 72 or 74, then propelled upon rear wheels 51. Skids 54 and wheels 51 provide for sliding invention 10 up or down stairs or multi levels (not shown). Invention 10 is transported and stored as chosen. For negotiating stairs or varied levels, invention 10 is held and tilted backward via handle 72 or 74, then propelled upon rear wheels 51. Skids 54 and wheels 51 provide for sliding invention 10 up or down stairs or multi levels (not shown). Invention 10 is transported and stored as chosen.

With respect to the above description then, it is to be realized that the optimum dimensional relationships for the parts of the mobile house cleaning cart, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A lightweight residential mobile house keeping cart, the cart comprising:

an upright L-shaped octahedron, the octahedron having a dimension of about 38 inches tall, 15 inches wide, and 8-14 inches depth, the octahedron further defined by a lower horizontal section of the L-shape joined to an upper vertical section of the L-shape, thereby forming two spaced apart L-shaped sides, the lower horizontal section partially comprising a front, a bottom and a top of a lesser depth than the bottom, the lower horizontal section thereby forming a container well, the upper vertical section partially comprising a back, a front, and a top, the front of the upper vertical section further comprising more than one drawer with pull, the drawers opening to the front of the L-shape, an upper back of the upper vertical section further comprising at least one handle, a lower portion of the back of the upper vertical section further comprising two spaced apart skids, the skids of a general trapezoidal shape with exposed sides having rounded corners, the skids immediately above and proximal to the wheels, respectively, a rearward most plane of the skids being coplanar to a rearward most dimension of the wheels, the top of the vertical section comprising a container well, the top of the vertical section further comprising a lip about the perimeter;

two spaced apart wheels on the bottom of the horizontal section, the two wheels disposed outside of rear corners of the back of the upper vertical section, the wheels rotating coplanar to the L-shaped sides;

two spaced apart omni-directional casters disposed on the bottom of the lower horizontal section toward two front corners;

more than one handle on the upper back of the upper vertical section, at least one handle comprised of a handle and towel rack;

the L-shaped sides further comprising a plurality of implement and supply holders, the implement and supply holders from a list comprised of spring C-clips, eyelets, handles, and hooks;

the back of the upper vertical section further comprised of a plurality of implement and supply holders, the implement and supply holders from a list comprised of spring C-clips, eyelets, handles, and hooks;

a spring loaded sliding lock mechanism comprising:

a vertical housing slideably containing a vertical slide;

a horizontal eyelet extended backwardly from a top of each more than one drawer with pull;

a plurality of spaced apart traverses with downwardly and perpendicularly disposed lock tabs disposed on the slide, each lock tab for removable insertion into each eyelet;

an abutment disposed at a top of the vertical housing;

a spring stop disposed atop the lock mechanism, the spring stop affixed to the slide;

an extension spring disposed between the abutment and the spring stop, whereby selectively lifting the spring stop disengages the lock tabs from the eyelets, thereby releasing the more than one drawer for opening.

* * * * *